US 8,315,009 B2

(12) United States Patent
Bumanlag et al.

(10) Patent No.: US 8,315,009 B2
(45) Date of Patent: Nov. 20, 2012

(54) SYSTEM AND METHOD FOR CHANGING RESONANT FREQUENCY IN HARD DISK DRIVE COMPONENTS

(75) Inventors: Napoleon B. Bumanlag, Laguna (PH);
Roger F. Galinggana, Jr., Laguna (PH);
Lloyd Henry Li, Metro Manila (PH);
Ray Nicanor Tag-At, Laguna (PH)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 827 days.

(21) Appl. No.: 11/904,961

(22) Filed: Sep. 28, 2007

(65) Prior Publication Data

US 2009/0086382 A1 Apr. 2, 2009

(51) Int. Cl.
*G11B 33/14* (2006.01)
(52) U.S. Cl. ............................................ 360/97.12
(58) Field of Classification Search ............... 360/97.02, 360/323, 234.5, 245.8, 245.9, 246, 264.2, 360/97.12, 97.21
See application file for complete search history.

(56) References Cited

U.S. PATENT DOCUMENTS

| | | | |
|---|---|---|---|
| 5,119,266 A | 6/1992 | Petry | |
| 5,558,477 A * | 9/1996 | Browning et al. | 408/143 |
| 5,680,274 A * | 10/1997 | Palmer | 360/245.9 |
| 5,761,031 A * | 6/1998 | Ajmani | 361/679.34 |
| 5,959,829 A | 9/1999 | Stevenson et al. | |
| 5,995,329 A * | 11/1999 | Shiraishi et al. | 360/245.9 |
| 6,178,074 B1 | 1/2001 | Gill | |
| 6,310,746 B1 * | 10/2001 | Hawwa et al. | 360/97.01 |
| 6,487,058 B1 | 11/2002 | Dykes | |
| 6,661,607 B2 | 12/2003 | Stein | |
| 6,680,824 B2 * | 1/2004 | Kamigama et al. | 360/265.9 |
| 6,704,157 B2 * | 3/2004 | Himes et al. | 360/75 |
| 6,724,560 B2 * | 4/2004 | Koganezawa et al. | 360/77.02 |
| 6,731,467 B1 * | 5/2004 | Balakrishnan | 360/245.8 |
| 6,819,556 B2 * | 11/2004 | Chen et al. | 361/679.34 |
| 6,822,823 B1 | 11/2004 | Tsuwako et al. | |
| 6,870,303 B2 * | 3/2005 | Park | 310/319 |
| 6,995,954 B1 | 2/2006 | Coon | |
| 7,489,493 B2 * | 2/2009 | Thaveeprungsriporn et al. | 361/220 |
| 2001/0033452 A1 | 10/2001 | Koganezawa et al. | |
| 2002/0196724 A1 * | 12/2002 | Henrichs | 369/75.1 |
| 2003/0165034 A1 | 9/2003 | Nikitin et al. | |
| 2005/0135011 A1 | 6/2005 | Jang et al. | |

(Continued)

FOREIGN PATENT DOCUMENTS

JP 59135662 8/1984

(Continued)

OTHER PUBLICATIONS

Derksen, et al., "X2Y Capacitors Reduce EMI/RFI Susceptibility of Computer Equipment", *EXPO*, (Feb. 2004),1-3.
Scancad International, et al., "EMI Stream: EMI Supression Tool", (2006),1-2.

(Continued)

*Primary Examiner* — Angel A. Castro

(57) ABSTRACT

A method for changing resonance frequency of hard disk drive components to reduce electromagnetic interference and electrostatic discharge from said components. Electrically sensitive hard disk drive components having a high resonance frequency consistent with a resonance of present electromagnetic interference forces are determined. A damper material is layered to alter electrical properties of said hard disk drive components to limit the magnitude of electromagnetic interference potential of said electrically sensitive component. Electrically sensitive hard disk drive components having a high capacitance are determined. The damper material is layered to increase a volume of the material constitution of the hard disk drive components to alter a capacitance of the hard disk drive component.

4 Claims, 4 Drawing Sheets

U.S. PATENT DOCUMENTS

2006/0198057 A1 9/2006 Leung et al.

FOREIGN PATENT DOCUMENTS

| | | |
|---|---|---|
| JP | 11340629 | 12/1999 |
| JP | 2003016752 | 1/2003 |
| WO | WO-02/080633 | 10/2002 |

OTHER PUBLICATIONS

Roleson, Scott "EMC Fundamentals: Field Probes as EMI Diagnostic Tools", *From Conformity*, (2007),1-6.

Ohta, et al., "EMI/EMC of Entire Automotive Vehicles and Critical PCB's", *Ansoft Corporation Presents: Converge. An Applications Workshop For High-Performance Design*, (2005),1-76.

\* cited by examiner

SYSTEM AND METHOD FOR CHANGING RESONANT FREQUENCY IN HARD DISK DRIVE COMPONENTS

TECHNICAL FIELD

The present invention relates generally to a method and a system for manufacturing and fabricating hard drive components in a manufacturing environment, and more particularly, to changing resonant frequency in the hard disk drive components to limit electromagnetic interference and electrostatic discharge.

BACKGROUND ART

In many processing and computing systems, magnetic data storage devices, such as disk drives are utilized for storing data. A typical disk drive includes a spindle motor having a rotor for rotating one or more data disks having data storage surfaces, and an actuator for moving a head carrier arm that supports transducer (read/write) heads, radially across the data disks to write data to or read data from concentric data tracks on the data disk.

In the manufacturing of the disk drive, many components with high electrical sensitivities are fabricated and manufactured. Devices such as the heads, sliders, etc., have electrical sensitivities to electromagnetic interferences or electrostatic discharge that requires the manufacturing environment worker to exercise great caution in the manufacturing of these components. Components such as suspensions comprise of conductive materials which tend to have conductive traces that are typically supported by insulative materials to help reduce the potential for electrostatic discharge or electromagnetic interference. When the suspension or similar components come into contact with each other.

Several manufacturing techniques have been adopted to reduce the amount of electrostatic discharge that occurs as the hard disk drive components are manufactured and assembled in the manufacturing environment. Some of these techniques include requiring assembly workers to wear electrostatic straps when they move the hard disk drive components about the manufacturing environment. These electrostatic straps help conduct electrostatic charges away from the components to ground.

Other methods used in limiting electrostatic discharge have involved a temporary conduct that shunts the conductive traces, e.g., during the attachment of components to each other, However, none of these techniques have been successful in substantially limiting electromagnetic interference at the material constitution level of these components. The techniques currently used are also cumbersome for the assembly floor workers as workers move about the assembly floor.

Therefore, what is need is a flexible way of component fabrication and manufacturing that permits static charges to be controllably dissipated from the materials used in the construction of these components such that the potential damage from electrostatic discharge or electromagnetic interference to electric components connected to such components is reduced.

SUMMARY

In accordance with certain aspects of the present invention, there is provided system and method for reducing electromagnetic interference or electrostatic discharge limiting features and designed for use in the fabrication and manufacture of hard disk drive components.

In one embodiment, the electromagnetic interference limiting feature of the present invention provides a damper material of the same resonant frequency as that of a component whose electromagnetic interference or electrostatic discharge characteristics is to be reduced to increase the mass (volume) of the component and thereby altering the magnitude of potential electrostatic discharge that the component may experience. In a further embodiment, the present invention provides a method of changing the resonant properties of the hard disk drive' components by altering the electrical properties of the composition materials of the components with high electrostatic discharge propensities by changing the capacitance of the component materials in order to alter the resonance frequency of the components.

BRIEF DESCRIPTION OF THE DRAWINGS

The accompanying drawings, which are incorporated in and constitute a part of the specification, illustrate embodiments of the invention, and together with the general description given above and the detailed description given below serve to explain the teachings of the invention.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for changing the resonance frequency of hard disk drive components with high potential for electrostatic discharge or electromagnetic interference during the manufacturing of the hard disk drive in a disk drive assembly environment.

Overview

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly (as shown in FIG. 1) forms the primary motive mechanical system that enables a disk-drive to randomly access data to be written or recorded on the disk surfaces.

Figure 1:
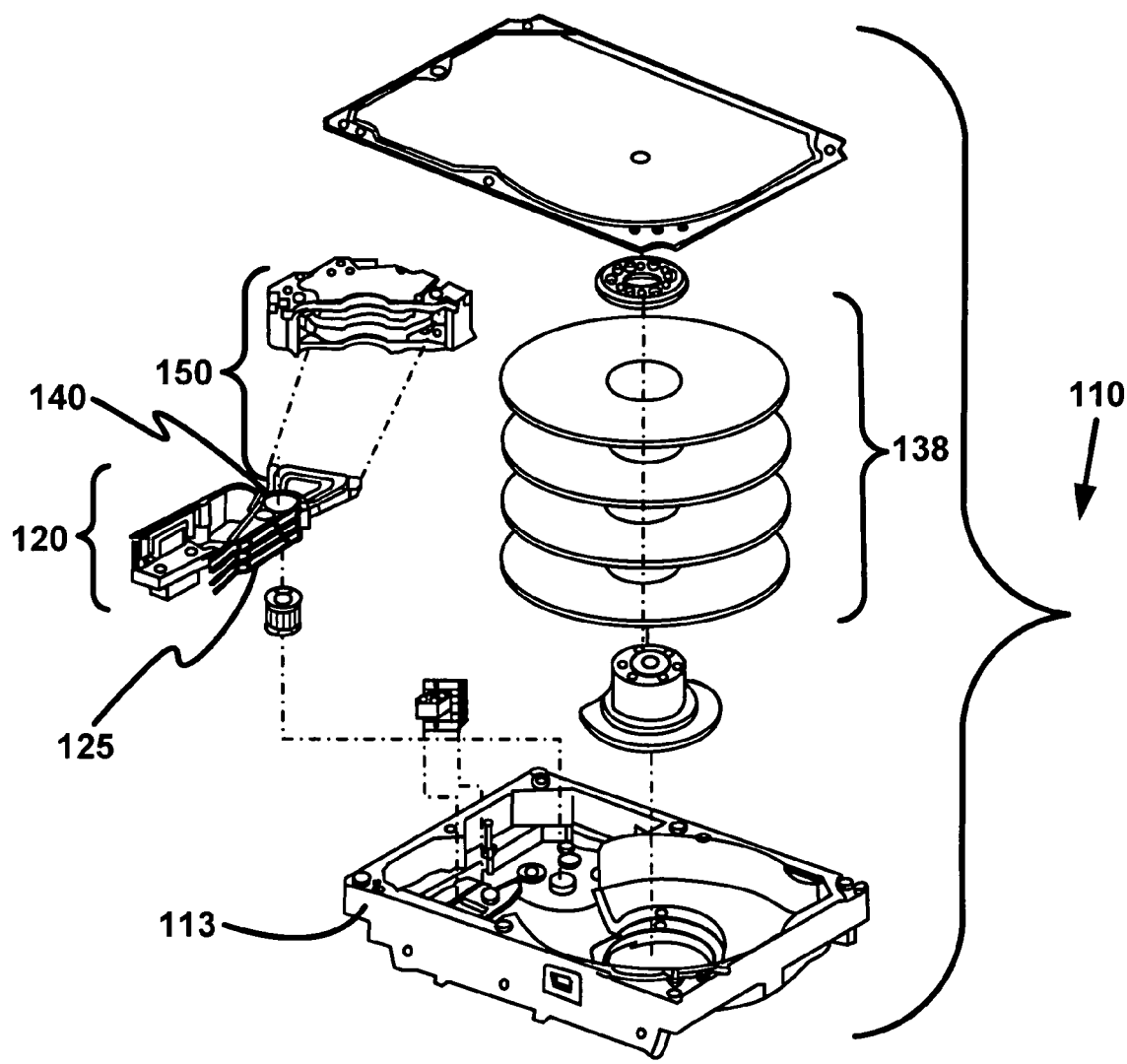
FIG. 1 is a plan view of an HDD with cover and top magnet removed with a serial identification label affixed to it in accordance with one embodiment of the present invention.

With reference now to FIG. 1 a schematic drawing of one embodiment of an information storage system including a magnetic hard disk file or drive 110 for a computer system is shown. Hard disk drive 110 has an outer housing or base 113 containing a disk pack having at least one media or magnetic disk 138. The disk pack (as represented by disk 138) defines an axis of rotation and a radial direction relative to the axis in which the disk pack is rotatable.

A spindle motor assembly having a central drive hub operates as this axis and rotates the disk 138 or disks of the disk pack in the radial direction relative to housing 113. An actuator 120 includes a plurality of parallel actuator arms 125 in the form of a comb that is movably or pivotally mounted to base/housing 113 about a pivot assembly 140. A controller 150 is also mounted to base 113 for selectively moving the comb of arms relative to the disk pack (as represented by disk 138).

Figure 2:
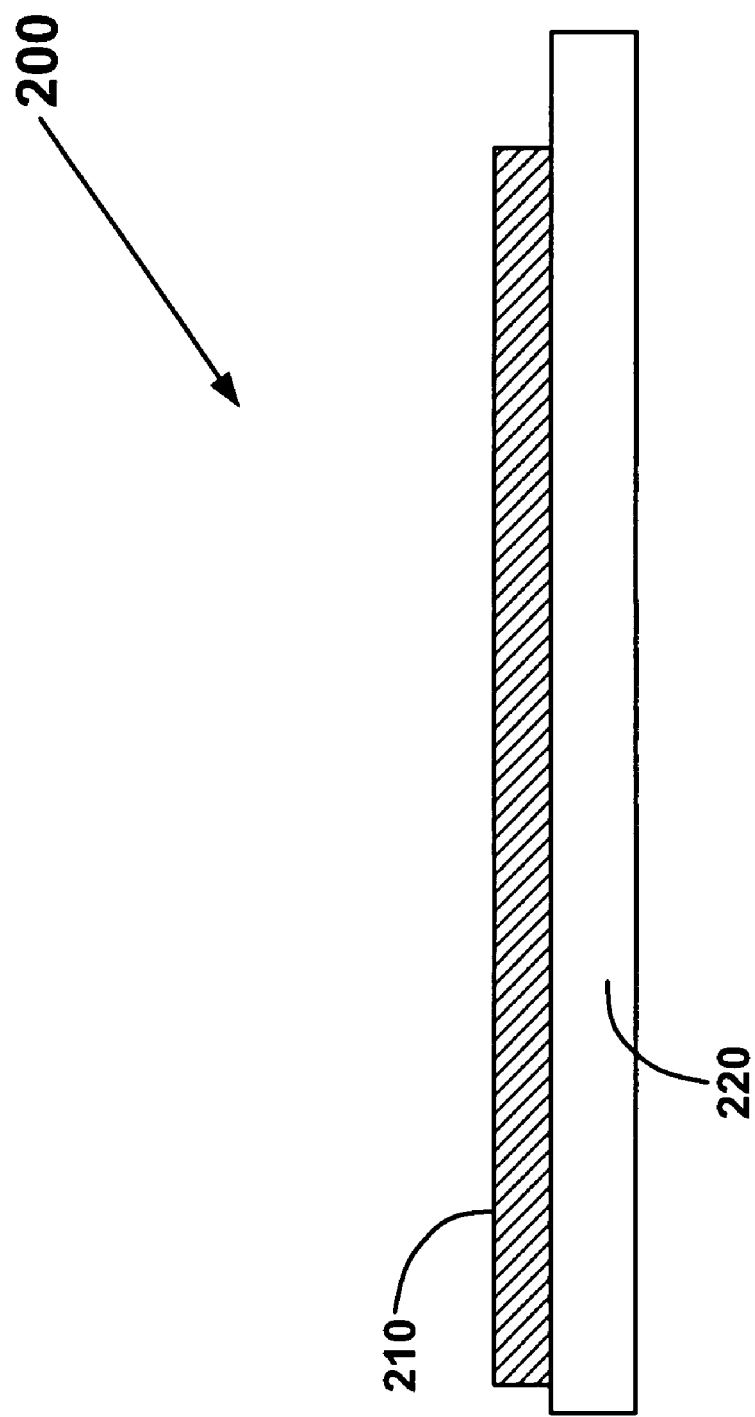
FIG. 2 is a block diagram illustration of a planar view of a hard disk component according to one embodiment of the present invention.

With reference now to FIG. 2 is shown an exemplary hard disk drive component with electrical sensitivity propensities to electrostatic discharges or electromagnetic interference potential. The device shown in FIG. 2 provides a system for altering the resonance frequency of the disk drive component in resonance with the EMI or ESD or other high frequency signals.

In accordance with the present invention, a damper material modifying layer 210 is provided to a surface of the underlying disk drive component 220 to alter the volume of the component 220 and thereby limit the electromagnetic or electrostatic discharge potential on the surface of the component 220. In one embodiment, the damper material may be a preformed material which is attached to the component 200. In one embodiment, the damper material 210 may be a thin film material that may be coated on a surface of the component 220.

In one embodiment, to limit or reduce the undue buildup of electrostatic discharge potential in the component 220 where ESD is or may be a problem, the damper material 210 provides a surface resistivity consistent with that of the component thereby increasing the total resistivity to any ESD or EMI or high signal frequency present.

In another embodiment of the present invention, the damper material 210 alters the capacitive properties of the underlying component 220 to alter the mass of the component 220 and increase the component resistance to ESD or EMI potential.

Figure 3:
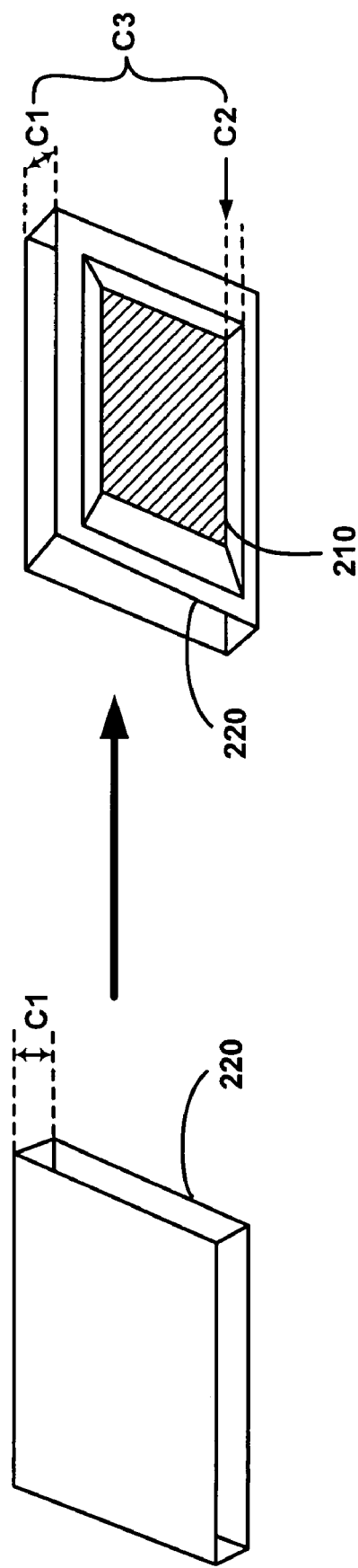
FIG. 3 is a block diagram illustration of the positional relation between two electrically sensitive hard disk drive components and the damper material according to one embodiment of the invention.

FIG. 3 is a block diagram illustration of one embodiment of a top plan view of the electrically sensitive hard disk drive component 220 and the damper material 210. As shown in FIG. 3, the addition of the damper material 210 with a capacitance of C1 not only increases the overall volume of the component 220 by the addition of an extra layer of material, but also alters the overall capacitance of the entire structure 300 to be C1+C2 with C and C2 being the capacitance of the damper material 210 and the component 220 respectively. In one embodiment of the present invention the total capacitance C3 is not in resonance with the high frequency signals that may cause electric discharge by the component 220.

In one embodiment, the change in resonance frequency of the component 220 may be expressed by the formula:

$ZC-ZI$ $wL=1/wC$ $(2pi*f)L=1/(2pi*f)C$ $(2pi*f)^2=1/LC$ $4pi^2 f^2=1/LC$ $f^2=\frac{1}{4}pi^2 LC$ $f=1/[2pi*sqrt(LC)]$ where f=resonant frequency
L=inductance of the material
C=Capacitance of the material Thus, by changing the materials capacitance (or inductance) results in a different resonant frequency.

Figure 4:
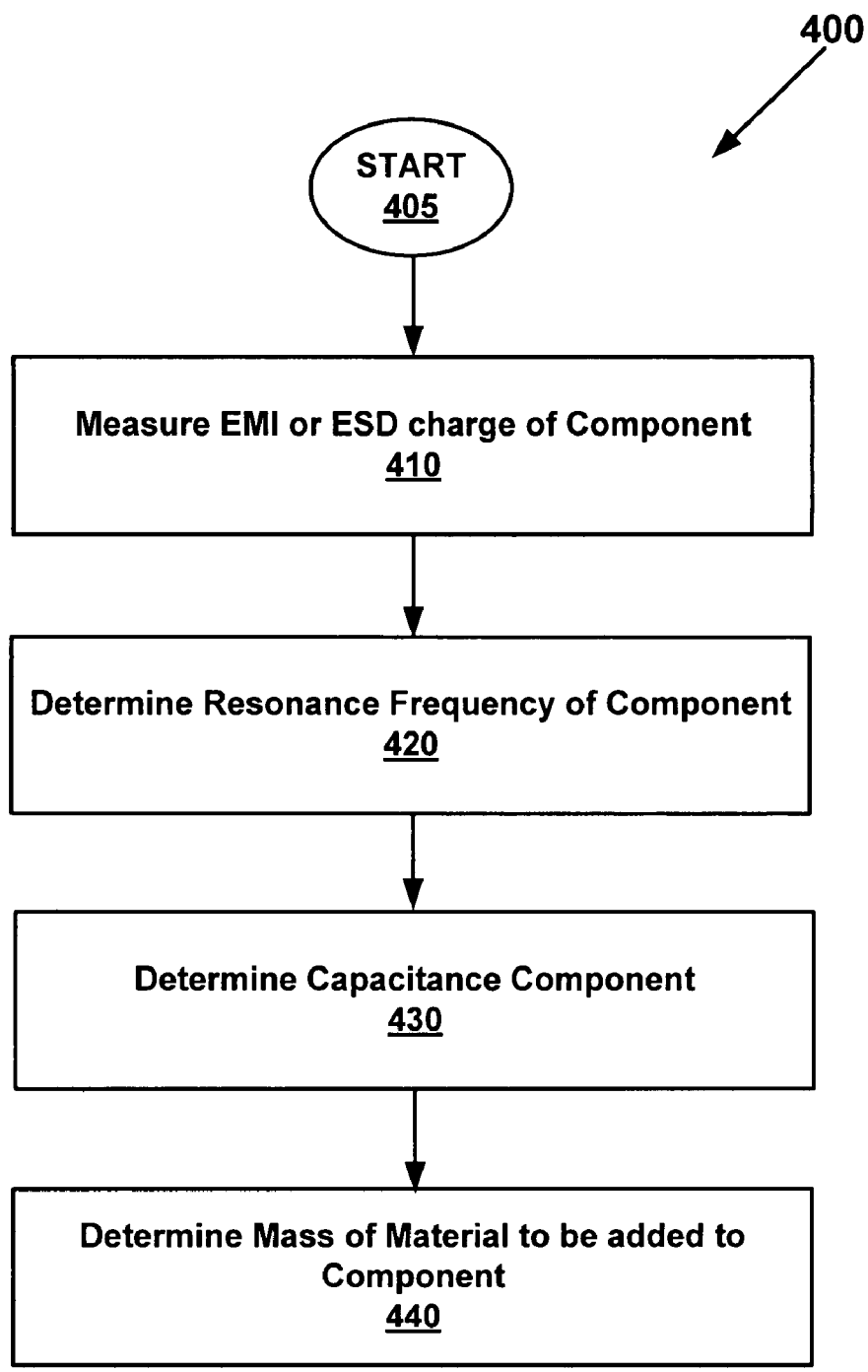
FIG. 4 is a flow diagram for changing resonance frequency of hard disk drive components to reduce electromagnetic interference and electrostatic discharge from said components according to an embodiment of the invention.

Reference is now made to FIG. 4 which illustrates one embodiment of changing resonance frequency of hard disk drive components to reduce electromagnetic interference and electrostatic discharge from said components according to an embodiment of the present invention. As illustrated in FIG. 4, at 410 one embodiment measures EMI or ESD charge of a component. At 420, one embodiment determines resonance frequency of the component. At 430, one embodiment determines capacitance of the component. At 440, one embodiment determines the mass of material to be added to the component.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for changing resonance frequency of hard disk drive components to reduce electromagnetic interference and electrostatic discharge from said components, comprising:
   determining electrically sensitive hard disk drive components having a high resonance frequency consistent with a resonance of present electromagnetic interference forces;
   layering a damper material to alter electrical properties of said hard disk drive components to limit the magnitude of electromagnetic interference potential of said electrically sensitive component;
   determining electrically sensitive hard disk drive components having a high capacitance; and
   layering the damper material to increase a volume of the material constitution of the hard disk drive components to alter a capacitance of the hard disk drive component.

2. The method of claim 1, further comprising:
   determining a resistivity to an EMI or high frequency component of the hard disk drive component.

3. The method of claim 1, further comprising:
   determining a mass of the damper material to identify an electrostatic discharge limiting volume of the hard disk drive component.

4. The method of claim 1, further comprising:
   layering the damper material to alter electrical properties of said hard disk drive components to limit the magnitude of electrostatic discharge in said electrically sensitive component.

* * * * *